2,921,916
Patented Jan. 19, 1960

2,921,916

CASTOR OIL, DIGLYCOLLIC ACID-ORGANIC DIISOCYANATE PREPOLYMERS AND CELLULAR PRODUCTS PREPARED THEREFROM

George C. Harrison, Roseville, and Howard C. Brinker, South St. Paul, Minn., assignors to Minnesota Mining and Manufacturing Company, St. Paul, Minn., a corporation of Delaware No Drawing. Application February 28, 1957
Serial No. 642,967

9 Claims. (Cl. 260—2.5)

The present invention relates to flexible foamed cellular plastics and to prepolymers from which the foamed plastics are produced. More particularly, this invention relates to new and useful prepolymers produced as the reaction products of certain castor oil based alkyd resins and an organic polyisocyanate and to the novel flexible, foamed cellular plastics produced upon the addition thereto of a foaming component comprising an isocyanate foaming agent and a foaming reaction catalyst or activator.

Isocyanate prepolymer systems, as opposed to "one-shot" systems wherein the ingredients are simultaneously mixed and foamed, are known to produce flexible foams under certain circumstances. However, prior to the present invention, insofar as we are aware it was not known that flexible foams could be produced from prepolymers based on castor oil based alkyds.

Also, heretofore known prepolymers based on castor oil and castor oil based alkyds are, along with polyisocyanate foaming component combinations generally, subject to certain disadvantages which seriously detract from their more general application. For example, these heretofore utilized prepolymers require very close control of the ratio of the prepolymer ingredients relative to one another to produce foams and require most accurate control of the ratio of foaming ingredients in the foaming component to one another and to the prepolymer to produce usable foams. These ingredient ratios must be further adjusted relative to one another upon the addition of even minor amounts of further additives such as emulsifiers, fillers, fire retardants, etc. Carefully prescribed external conditions of temperature, humidity and moving air must be strictly adhered to, and usually the foaming reaction proceeds so rapidly that machine mixing is generally the only means of obtaining foamed material in any quantity. Foaming in thin section is difficult and erratic, if not impossible. Foaming in exposed section (i.e. in the absence of a confining mold or confining surfaces), is not feasible because of premature collapse and inability of the foamed body to conform to a predetermined outline form. Further, although some of these heretofore known prepolymers can be mixed with the foaming component and sprayed in place, expensive and elaborate spraying equipment is required along with strict adherence to the component ratios and external conditions previously noted.

It is an object of this invention to provide novel isocyanate containing prepolymers based on modified castor oil alkyd resins for the production of flexible or resilient polyurethane foams, which prepolymers utilize a minimum amount of polyisocyanate in their formation.

It is an object of this invention to provide flexible low density foamed cellular plastics from these isocyanate containing prepolymers.

It is an object of this invention to provide castor oil based alkyd-isocyanate prepolymers which produce foams of controllable shape in exposed thin section and which foam well in thin section in molds and other confined spaces.

Another important object of this invention is to provide castor oil based alkyd-isocyanate prepolymers which have relatively long mixing and placing times upon and after mixing with their foaming components coupled with rapid and excellent shape retention of the foamed product enabling extrusion onto exposed surfaces from simple and inexpensive extrusion and spraying equipment.

Another object is to provide a prepolymer for producing foams in decorative surface applications, a new field of application for isocyanate foams.

It is an object of this invention to provide castor oil based alkyd-isocyanate prepolymers which produce usable and substantially uniform foams without the necessity of close and accurate control of either the ratio of prepolymer ingredients relative to one another or the ratio of foaming ingredients of the foaming component to one another or to the prepolymer.

It is an object of this invention to provide castor oil based alkyd-isocyanate prepolymers wherein the ratio of ingredients of the prepolymer and the foaming component to one another in the production of foams is relatively independent of the inclusion of other additives to the prepolymer or the foaming component or both.

It is an object of this invention to provide castor oil based alkyd-isocyanate prepolymers which produce usable and substantially uniform foams relatively independently of external conditions such as temperature, humidity and moving air.

The foregoing objects, as well as other objects and advantages which will become apparent as the description proceeds, are accomplished by the novel castor oil alkyd based prepolymers and the foamed products thereof which constitute this invention.

Basically the prepolymers of this invention comprise the low viscosity, resinous reaction products of organic polyisocyanates, and polyhydroxylated polyesters formed by modifying or bodying castor oil or similar polyhydroxy compound through esterification thereof with certain dibasic carboxylic acids.

In the formation of the prepolymer, any organic polyisocyanate may be used, however, arylene diisocyanates, which are liquid at room temperatures are preferred for ease of mixing with the castor oil based alkyd. Preferably 65–100% 2,4-tolylene diisocyanate with any balance being 2,6-tolylene diisocyanate is used as the polyisocyanate component. Other aromatic hydrocarbon polyisocyanates may be used such as di-anisidine diisocyanate, bitolyl p,p'-diisocyanate, alkyl substituted meta xylene diisocyanate, and the like. Aliphatic polyisocyanates may be used, but are not as reactive as aromatic polyisocyanates and have a higher toxicity level.

To prepare the alkyd component of the prepolymer, castor oil, or a similar natural or synthetic oil comprising primarily glycerides of hydroxylated liquid long chain aliphatic carboxylic acids such as quince seed oil, is esterified with a dibasic carboxylic acid by heating in the ratio of about 2 castor oil molecules for each dibasic acid molecule until a liquid alkyd resin having an acid number not higher than about 35 is produced. The molar ratio specified provides approximately 2-COOH groups for about each 6-OH groups. A 10% variation in the ratio of —COOH and —OH groups to one another is permissible without seriously detracting from the quality or stability of the prepolymer. More than a 10% increase in the —COOH to —OH groups causes increased viscosity of the alkyd, and the addition of diisocyanate thereto results in a prepolymer having a very short pot life, i.e., short time before gelation. More than 10% reduction in the —COOH to —OH groups results in a prepolymer which upon the addition of the foaming component thereto forms rigid foamed products and are more sensitive to ingredient concentrations and external conditions than is desirable. While the usable acid number range for the alkyd has been noted as being no higher than about 35, preferably the acid number is retained at a value not higher than about 5. Since in general as the acid number increases the viscosity of the prepolymer decreases and foaming and gassing during the formation of the prepolymer increase using up isocyanate groups that would be available otherwise, alkyds having acid numbers above 35 are economically unsound.

There is wide divergence in the performance of prepolymers utilizing different dibasic acids in the formation of the castor oil based alkyd.

Preferred dibasic acids have been found to be linear alkylene ether dicarboxylic acids. In particular diglycollic acid has been found to produce the prepolymer that has a remarkable combination of properties.

Prepolymers based on castor oil-diglycollic acid alkyds have exceptionally long mixing and placing times in the formation of foams, do not require close control of either the prepolymer ingredients or the foaming ingredients, foam well irrespective of temperature, humidity, and moving air in both thick and thin section, and accept a wide range in amounts of additives thereto without detrimentally affecting the quality of the foamed products. These prepolymers foam so well in exposed thin section (no confining mold) that their performance in the production of foams for decorative surface applications is unique, opening a new field of application for polyurethane foams.

The preparation of an alkyd resin of castor oil and diglycollic acid is set forth in the following illustrative example. Parts in the examples, as well as elsewhere herein, are by weight unless otherwise specified.

Example 1

A kettle was charged in parts by weight with 1850 parts #3 castor oil, 135 parts diglycollic acid, 18.5 parts xylene and 3 parts anthraquinone (to lighten the color product. The kettle was then closed with the exception of a vapor line leading therefrom to a condenser, and azeotropic distillation of the mixture carried out at about 425° F. until about 38 parts of water were removed. Heating was discontinued and a vacuum of 2 inches of mercury applied to the kettle, which was then heated to 400° F. to remove the azeotrope solvent and subsequently cooled in vacuum to 300° F. The vacuum was released and the product removed from the kettle. This product, which was the desired alkyd resin of diglycollic acid modified castor oil, had a viscosity of 2700 centipoises at 25° C. and an acid number of 5, as measured by end group determination.

The formation of a prepolymer and foamed articles from the alkyd resin of Example 1 are set forth in the following example.

Example 2

30 parts tolylene diisocyanate (80% 2,4- and 20% 2,6-tolylene diisocyanate) were mixed with 70 parts of the alkyd resin of Example 1 at room temperature to provide a ratio of about 2:1 of —NCO groups to reactive —OH groups in the mixture. The mixture was stirred with a mechanical mixer for about 1 hour at about 135° C. to provide a homogeneous prepolymer.

A flexible cellular plastic article having a density of about 4#/cu. ft. was produced from this prepolymer by combining 50 parts prepolymer with 6 parts of a 3:1 mixture of water and diethyl ethanol amine, pouring the resulting mixture into a mold form, and then removing the foamed product from the mold. The prepolymer and foaming component (the water and diethyl ethanol amine) were combined by hand mixing for approximately 45 seconds. About 15 seconds were consumed in placing the resultant mass into the mold, where it remained about 5 minutes before removal therefrom. The foamed product possessed a thin, yellowish skin and when cut into sections revealed an interior structure of small, uniform cells. Recovery from deformation was slow, but complete.

Other foams have been produced following the procedure of this example wherein the isocyanate to hydroxyl ratios of the prepolymers were varied from about 1.5:1 to about 2.5:1. All foams produced therefrom were flexible, dimensionally stable, exhibited a minimum amount of shrinkage, were of low density and possessed small uniform internal cell structures.

Water is the preferred foaming agent although organic acids and anhydrides are also known as isocyanate foaming agents. Any tertiary amine or its salts or mixtures thereof can be used as the catalyst. In addition to diethyl ethanol amine, N-methyl morpholine and N-ethyl morpholine have been used to produce foams in accordance with the procedure of Example 2. The specific amines noted are, of course, exemplary only, the choice being dependent on odor, solubility, or other characteristics of the catalyst chosen.

The ratio of foaming agent to amine catalyst in this example was about 3:1 and the ratio of foaming component to prepolymer about 12:100. With respect to prepolymers based on the diglycollic acid-castor oil alkyds, the water to amine ratio can be varied from about 2:1 to about 5:1. A 3:1 ratio is preferred for most applications where hand mixing is utilized in the production of foams. A 4:1 ratio is preferable where machine mixing is utilized. The ratio of foaming component to prepolymer can be varied from about 4:100 to about 15:100. Within the limits noted herein, increasing the amount of water relative to prepolymer increases the foam density whereas decreasing the amount of water relative to prepolymer decreases the foam density.

To produce a foamable prepolymer it is necessary that there be unreacted —NCO groups present in the prepolymer available for foaming and desirable that there be no other functional groups present so that premature cross linking is avoided. An isocyanate to hydroxyl ratio of slightly greater than 1:1 will produce a foamed cellular plastic as will an isocyanate to hydroxyl ratio of 3:1 or greater; the foamed products resulting from these extremes have limited utility however, since, for example, in the first instance the product is exceedingly dense and has little expansion whereas in the second instance the product has little mechanical strength.

Isocyanate to hydroxyl ratios from about 1.5:1 to about 2.5:1 in the formation of the prepolymers of this invention are preferred and prepolymers based on these ratios produce the preferred low density, dimensionally stable, flexible foams possessing small uniform cells, and having a minimum amount of shrinkage.

With the diglycollic acid modified castor oil and tolylene diisocyanate prepolymer, the best ratio of isocyanate to hydroxyl groups has ben found to be in the range of about 1.9:1 to about 2.3:1. Ratios within this range are obtained by combining the modified castor oil alkyd and diisocyanate in a percent by weight range of about 26–39% diisocyanate to about 74–61% alkyd, these prepolymers providing excellent foamed cellular products ranging in density from about 1.2 pounds per cubic foot to about 4.5 pounds per cubic foot. For general applications the 70:30 prepolymer is preferred, having a low toxicity level, and producing uniformly good quality foamed cellular plastics having a density of about 2.5 to 4.5 pounds per cubic foot with small, uniform cells and good mechanical strength.

Obtaining good foamed products from this castor oil-diglycollic acid alkyd based prepolymer does not necessitate exceedingly close control of the prepolymer ingredients, foaming agent or catalyst. Nor are particular conditions of temperature, moving air or mechanical mixing necessary to obtain quality flexible foamed products utilizing this prepolymer; this prepolymer foams well under atmospheric pressure relatively independently of moving air and humidity at temperatures of from —20° F. to 100° F.

Because of its long mixing time (i.e. time available for mixing when combined with the foaming component), coupled with its relative insensitivity to ingredient proportions and external conditions, this prepolymer has an extremely wide range of applications in the production of foamed cellular products. For example, a full minute and a half can elapse during mixing of the prepolymer wtih the foaming component and placing the reaction mixture into a mold without appreciable gas loss or loss of final foam volume. Further, by reducing the amount of catalyst the mixing and placing time can be extended to two minutes without appreciable loss of final foam volume.

The inclusion of additives to either the prepolymer or the foaming component or both does not appear to affect either the ratio of prepolymer and foaming component to one another, or the ratio of their ingredients to one another. Thus, in addition to the foaming component, to the diglycollic acid modified castor oil based prepolymer has been added without requiring adjustment of ingredient ratios, up to 10% by weight fire retardant such as tri-chloro-ethyl phosphate or tri-cresyl phosphate, up to 10% by weight finely divided filler, such as wood flour or silica powder—which additive upon mixing of the prepolymer and foaming component give the resulting foam prior to gelation a thixotropic, "whipped cream" effect or "false" body so it will remain in place and better retain its shape when trowelled onto or otherwise applied to a surface, and up to 20% by weight fibrous filler such as glass and nylon fibers to give increased tensile strength to the foam.

The use of "silicone X520," a dimethyl, end block silicone oil produced by the Carbide and Carbon Chemical Co., provides the most potent modifier of digycollic acid modified castor oil alkyd-toluene diisocyanate prepolymer. It has an unusual action during the foaming process keeping the gas retained in rather strong walled cells producing a foam with more closed cells. Thus this foam with the incorporation of this modifier from 0.01 to 0.5% has greater resiliency, lower vapor transmission, and better heat transmission resistance. Consequently, while this foam has a greater tendency to shrink and pull away from mold surfaces, the desirable properties imparted to the foam by the modifier compensate for this disadvantage in many applications.

These diglycollic acid modified castor oil based prepolymers produce foams which have excellent shape retention when foamed in exposed thin section, which in conjunction with those properties noted in the preceding portions of this specification, enable the application of these foams in the field of decorative applications, a new field for isocyanate foams as previously indicated. The prepolymer and foaming component can be placed in separate compartments of a simple inexpensive container such as a flexible tube with means for communicating the compartments for mixing the ingredients.

Upon communication of the compartments and mixing, the foam composition can be extruded from the container onto a surface to fill in scenery outlines or to form letters or words or other decorative patterns with the expansion and setting of the foam providing a three dimensional image. In this connection it is possible to reshape the extruded foam before its final set. Thus, the foam can replace paint in many instances to give the additional dimension of depth which paint cannot supply.

The flexibility of these foamed products along with the capability of the smooth skins formed when molded in place to retain dyes and colors makes their use ideal in the formation of molded toys, figurines and the like, crash pads, expansion joint fillers and sound deadening panels. These foams are ideal for packaging, or encapsulation in the packaging, of fragile merchandise and for certain types of electrical padding.

These foams are capable of holding 6 to 7 times their own weight of water when placed on a flat surface and serve well as florist's frogs and the like.

These foams hold and wick oil remarkably well and by virtue of the general uniformity of quality of the foams irrespective of external conditions or changes in ingredient proportions of their prepolymers and foaming components within relatively wide ranges, along with the easy handleability and long storage life of the prepolymers are unique among isocyanate foamed plastics.

Following the procedures of the example, other modified castor oil based prepolymers and their resulting foams have been produced. Thus, foams have been produced from prepolymers wherein the castor oil has been modified with a number of dicarboxylic acids, namely adipic, phthalic, sebacic, iso-sebacic, maleic and succinic acids. In the formation of these prepolymers, and foams therefrom, the weight and molar ratios of ingredients and end groups set forth in the specific examples preceding were generally adhered to.

All of the modified castor oil resins noted in the preceding paragraph produced prepolymers which, upon foaming in molds, yielded flexible, resilient foams of reasonably good quality as evidenced by the lack of voids in the foamed body and the appearance of a cross sectional structure of generally uniform small cells. However, none of these prepolymers was as insensitive to concentration changes of foaming component to prepolymer as were the diglycollic acid modified castor oil based prepolymers; nor would any of these other prepolymers foam well in exposed thin section. While the mixing and placing times of these other dicarboxylic acid modified castor oil alkyd based prepolymers was generally less than that of the diglycollic acid-castor oil alkyl based prepolymers, only the phthalic acid-castor oil alkyd based prepolymer was so short (about 20 seconds) that machine mixing was required.

The isosebacic acid-castor oil based prepolymer most closely approximates the diglycollic acid-castor oil based prepolymer in its performance, having a relatively long shelf life, retaining its utility after exposure to air, having mixing and placing times on the order of one minute, and producing molded forms exhibiting excellent gas retention as evidenced by their ability to foam well in both thick and thin sections. This prepolymer has a tendency to gel during mixing with the foaming component, but the tendency is less marked by the inclusion of about 30 parts of an anti-gelling agent such as methyl cellulose to each 100 parts foaming component. Other anti-gelling agents as, for example, ethyl cellulose, sodium carboxy methyl cellulose, polyacrylic acid, sodium lactate, polyvinyl alcohol and the like, may also be used.

Improvement can be had in other prepolymers by the addition of emulsifiers, thickeners, and fine particle modifiers of the type noted previously herein with reference to diglycollic acid-castor oil based prepolymers, depending on the deficiencies to be obviated or corrected.

In general the foams produced from dicarboxylic acid modified castor oil based polyesters, and particularly those produced from diglycollic and equivalent acid modified castor oil based prepolymers are sufficiently free from dependence on close control of concentrations and external conditions in the production of flexible foams to permit the utilization of unskilled labor and inexpensive equipment without sacrificing foam quality.

By virtue of the excellent gas retention the diglycollic acid-castor oil based prepolymers impart to foams made therefrom, this prepolymer forms excellent additives for other polyisocyanate prepolymers with which they are compatible to impart more uniform cell structures to foams produced therefrom.

Having thus described the invention what is claimed as new is as follows:

1. A stable prepolymer from which flexible foamed cellular plastics can be produced comprising the product of the reaction of about 26–39 weight percent tolylene diisocyanate and about 74–61 weight percent of a polyhydroxylated polyester having an acid number no higher than about 35, said polyester comprising the condensation product of the reaction of about 1 mol of diglycollic acid and about 2 mols of castor oil.

2. A flexible cellular plastic comprising the foamed reaction product of (1) about 100 parts by weight of the product of the reaction of an aromatic polyisocyanate and a polyhydroxylated polyester having an acid number no higher than about 35 and comprising primarily glycerides of normally hydroxylated liquid long chain aliphatic carboxylic acids and diglycollic acid combined in a molar ratio of about 2:1, said diisocyanate and polyester being combined in a ratio of isocyanate to hydroxyl groups in the range of about 1.5:1 to about 2.5:1 and (2) about 4–15 parts by weight of a foaming component comprising water and a tertiary amine catalyst.

3. A flexible cellular plastic comprising the foamed reaction product of (1) about 100 parts by weight of the product of the reaction of an arylene diisocyanate and a polyhydroxylated polyester having an acid number no higher than about 35 and comprising castor oil and diglycollic acid combined in a molar ratio of about 2:1, said diisocyanate and polyester being combined in a ratio of isocyanate to hydroxyl groups in the range of about 1.5:1 to about 2.5:1 and (2) about 4–15 parts by weight of a foaming component comprising water and a tertiary amine catalyst.

4. The flexible cellular plastic of claim 3 wherein said water, and said amine catalyst are combined in a weight ratio of about 2–5:1.

5. A flexible cellular plastic comprising the foamed reaction product of (1) about 100 parts of the product of the reaction of about 26–39 weight percent tolylene diisocyanate and about 74–61 weight percent of an alkyd resin of castor oil and diglycollic acid combined in a molar ratio of about 2 parts oil to 1 part acid and having an acid number no higher than about 5, and (2) about 4–15 parts of a foaming component comprising water and a tertiary amine catalyst.

6. The flexible cellular plastic of claim 5 wherein said water and said catalyst are combined in a weight ratio of about 2–5:1.

7. A stable prepolymer foamable to a flexible cellular product upon addition of water and a tertiary amine catalyst thereto and comprising the reaction product of an aromatic polyisocyanate and a diglycollic acid modified castor oil combined in an isocyanate to hydroxyl ratio of from about 1.5 to about 2.5, said modified castor oil having an acid number no higher than about 35.

8. A stable prepolymer foamable to a flexible cellular product upon addition of water and a tertiary amine catalyst thereto and comprising the reaction product of an arylene diisocyanate and a diglycollic acid modified castor oil combined in an isocyanate to hydroxyl ratio of from about 1.5 to about 2.5, said modified castor oil having an acid number no higher than about 35.

9. A stable prepolymer foamable to a flexible cellular product upon addition of water and a tertiary amine catalyst thereto and comprising the reaction product of an arylene diisocyanate and a diglycollic acid modified castor oil combined in an isocyanate to hydroxyl ratio of from about 1.5 to about 2.5, said modified castor oil having an acid number no higher than about 5 and including about 1 mol of diglycollic acid per mol of castor oil.

References Cited in the file of this patent

UNITED STATES PATENTS

| 2,298,914 | Auer | Oct. 13, 1942 |
| 2,787,601 | Detrick et al. | Apr. 2, 1957 |
| 2,788,335 | Barthel | Apr. 9, 1957 |

OTHER REFERENCES

Hopkins: "Rubber Age," volume 78, No. 2, November 1955, page 240.